(12) United States Patent
Elmahdy et al.

(10) Patent No.: US 12,516,174 B1
(45) Date of Patent: Jan. 6, 2026

(54) METHOD OF SYNTHESIZING A NANOCOMPOSITE INCLUDING METAL NANOPARTICLES AND POLYACRYLONITRILE MATRIX

(71) Applicant: PRINCE SATTAM BIN ABDULAZIZ UNIVERSITY, Al-Kharj (SA)

(72) Inventors: Mahdy Mohammed Elmahdy, Al-Kharj (SA); Talal Farhan Ahmed Qahtan, Al-Kharj (SA); Maged Mohammed Ahmed Azzam, Al-Kharj (SA); Mohammed Faraj Abdullah Alyami, Al-Kharj (SA); Satam Fahad Alotibi, Al-Kharj (SA); Abdellah Thami Allal Kaiba, Al-Kharj (SA)

(73) Assignee: PRINCE SATTAM BIN ABDULAZIZ UNIVERSITY, Al-Kharj (SA)

( * ) Notice: Subject to any disclaimer, the term of this patent is extended or adjusted under 35 U.S.C. 154(b) by 0 days.

(21) Appl. No.: 19/312,799

(22) Filed: Aug. 28, 2025

(51) Int. Cl.
| | |
|---|---|
| *C08K 3/08* | (2006.01) |
| *C25B 7/00* | (2006.01) |
| *C25B 11/046* | (2021.01) |
| *C25C 1/08* | (2006.01) |
| *C25C 1/12* | (2006.01) |
| *C25C 7/02* | (2006.01) |

(52) U.S. Cl.
CPC ............... *C08K 3/08* (2013.01); *C25B 7/00* (2013.01); *C25B 11/046* (2021.01); *C25C 1/08* (2013.01); *C25C 1/12* (2013.01); *C25C 7/02* (2013.01); *C08K 2003/0843* (2013.01); *C08K 2003/085* (2013.01); *C08K 2003/0856* (2013.01); *C08K 2003/0862* (2013.01); *C08K 2201/011* (2013.01)

(58) Field of Classification Search
CPC ........... C08K 3/08; C25B 11/046; C25B 7/00; C25C 1/08; C25C 1/12; C25C 7/02
See application file for complete search history.

(56) References Cited

U.S. PATENT DOCUMENTS

2008/0254362 A1    10/2008    Raffaelle et al.

FOREIGN PATENT DOCUMENTS

| IN | 202221040095 A | | 8/2022 | |
| JP | 2000-345371 A | | 12/2000 | |
| KR | 1020100087864 | * | 8/2010 | ............... B82B 3/00 |

(Continued)

OTHER PUBLICATIONS

English machine translation of KR 10-2010-0087864. (Year: 2010).*

(Continued)

*Primary Examiner* — John E Uselding
(74) *Attorney, Agent, or Firm* — Oblon, McClelland, Maier & Neustadt, L.L.P.

(57) ABSTRACT

A method for synthesizing a nanocomposite where the nanocomposite includes a polyacrylonitrile matrix having uniformly distributed metal nanoparticles. The method includes applying a current to an electrolysis cell including an acrylonitrile monomer, a supporting electrolyte, a solvent, a pure metal anode, and a metal cathode. While applying the current, the anode is oxidized to form the metal nanoparticles, and the acrylonitrile monomer is polymerized to form the polyacrylonitrile matrix around the metal nanoparticles.

20 Claims, 11 Drawing Sheets

(56) References Cited

FOREIGN PATENT DOCUMENTS

WO    WO 2009/002569 A2    12/2008

OTHER PUBLICATIONS

Murugadoss et al. Development of electrospun PAN/CoS nanocomposite membrane electrolyte for high-performance DSSC. Ionics (2018) 24:4071-4080. (Year: 2018).*
Kozhitov et al. Novel Metal Carbon Nanocomposites and Carbon Nanocrystalline Material with Promising Properties for the Development of Electronics. Russian Microelectronics, 2013, vol. 42, No. 8, pp. 498-507. (Year: 2013).*
Yang et al. Synthesis of organic-inorganic hybrids by miniemulsion polymerization and their application for electrochemical energy storage. Energy Environ. Sci. 2012, 5, 7025. (Year: 2012).*
Suraj N. Bhadani, et al., "Electrochemical polymerization of acrylonitrile with quaternary salts", Journal of Applied Polymer Science, vol. 44, Issue 1, Jan. 5, 1992 (Abstract).

\* cited by examiner

METHOD OF SYNTHESIZING A NANOCOMPOSITE INCLUDING METAL NANOPARTICLES AND POLYACRYLONITRILE MATRIX

BACKGROUND

Technical Field

The present disclosure is directed to an electrochemical synthesis of a nanocomposite. More particularly, synthesizing a nanocomposite by integrating transition metal nanomaterials into polymer matrices through an electro polymerization-assisted process.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present disclosure.

Polymer-based nanocomposites have gained attention for their enhanced mechanical, electrical, and thermal properties. These advanced materials are formed by incorporating nanoscale fillers such as metal nanoparticles, metal oxides, carbon-based nanomaterials (carbon nanotubes or graphene) or nanoclays into a polymer matrix. The resulting nanocomposites exhibit superior strength, stiffness, conductivity, and heat resistance, making them highly suitable for a wide range of applications including electronics, aerospace, automotive, biomedical devices and energy storage systems. However, traditional methods for incorporating metal nanoparticles such as chemical reduction, sol-gel processes and electrospinning require multiple steps, costly reagents, and often result in poor nanoparticle dispersion and weak metal-polymer interactions, limiting composite performance.

Separately synthesized nanoparticles may not adhere well to the polymer matrix and often need post-processing to achieve desired properties, adding to fabrication time and cost. Current methods for synthesizing transition metal nanomaterials such as chemical synthesis, casting, and doping also suffers from several limitations. These techniques typically require pre-synthesized metal nanoparticles, multiple processing steps, and the use of stabilizers or reducing agents, which increase complexity, cost, and environmental impact. Moreover, poor nanoparticle dispersion and weak metal-polymer interactions often compromise the performance of the resulting composites.

Studies have shown that electrochemical deposition is a viable method for synthesizing metal nanoparticles however, its direct integration into polymer matrices during polymerization is still an emerging area of research. Recently, in-situ synthesis of nanomaterials within polymer matrices has attracted significant interest due to its ability to strengthen nanoparticle polymer interactions and enhance the overall properties of the composite material. One promising strategy involves the electrochemical oxidation of metal electrodes to directly generate nanoparticles within a growing polymer matrix providing a cost-effective and scalable alternative to conventional methods [Chen, A. et al., Chem. Rev. 2015, 115, 21, 11999]. While existing patents describe various techniques for polymer-nanocomposite fabrication, most rely on the separate synthesis of nanoparticles followed by blending with polymers, rather than concurrent electro-polymerization-assisted nanoparticle formation [De Vooys, A. C. A; et al., J. Electroanalytical Chem. 2001, 506, 127]. Only a limited number of studies have investigated the direct use of pure metal electrodes as nanoparticle sources in an electrochemical polymerization system.

Accordingly, one objective of the present disclosure is to synthesize polymer-reinforced nanocomposites with improved mechanical, electrical, and thermal properties, while overcoming the drawbacks and limitations associated with existing materials and fabrication methods known in the art.

SUMMARY

In an exemplary embodiment, a method for synthesizing a nanocomposite is described. The nanocomposite includes a polyacrylonitrile matrix having uniformly distributed metal nanoparticles embedded therein. The said method includes applying a current to an electrolysis cell including an acrylonitrile monomer, a supporting electrolyte, a first aprotic solvent, a pure metal anode, and a metal cathode. While applying the current, the anode is oxidized to form the metal nanoparticles, and the acrylonitrile monomer is polymerized to form the polyacrylonitrile matrix around the metal nanoparticles.

In some embodiments, the polyacrylonitrile matrix and the metal nanoparticles are formed simultaneously.

In some embodiments, the current applied is 0.2-8 milliamperes per square centimeter (mA cm$^{-2}$).

In some embodiments, the current is applied for 20-40 hours.

In some embodiments, the concentration of acrylonitrile monomer is 1-4 M.

In some embodiments, the pure metal anode is selected from the group consisting of copper, nickel, cobalt, and iron.

In some embodiments, the pure metal anode is a metal strip, having a length of 2-3 cm and a width of 0.5-2 cm.

In some embodiments, the metal cathode is platinum.

In some embodiments, the metal cathode is a metal strip, having a length of 2-3 cm and a width of 0.5-2 cm.

In some embodiments, the electrolysis cell is kept at a temperature of 25° C. during the applying.

In some embodiments, the first aprotic solvent is dimethylformamide.

In some embodiments, the supporting electrolyte is cetyltrimethylammonium bromide.

In some embodiments, the concentration of the supporting electrolyte is 0.001-0.01 M.

In some embodiments, the nanoparticles are crystalline.

In some embodiments, the nanoparticles have an average diameter of 10-200 nm.

In some embodiments, the method of washing and drying the polyacrylonitrile matrix is described. The method includes washing the polyacrylonitrile matrix having uniformly distributed metal nanoparticles embedded therein with water and a second organic solvent. Further, the method includes drying the matrix in an oven.

In some embodiments, the second organic solvent is ethanol.

In some embodiments, the matrix was dried in an oven at 40-50° C.

In some embodiments, the current density applied to the electrolytic cell is constant during the applying.

In some embodiments, the metal nanoparticles degrade between 700-1000° C.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
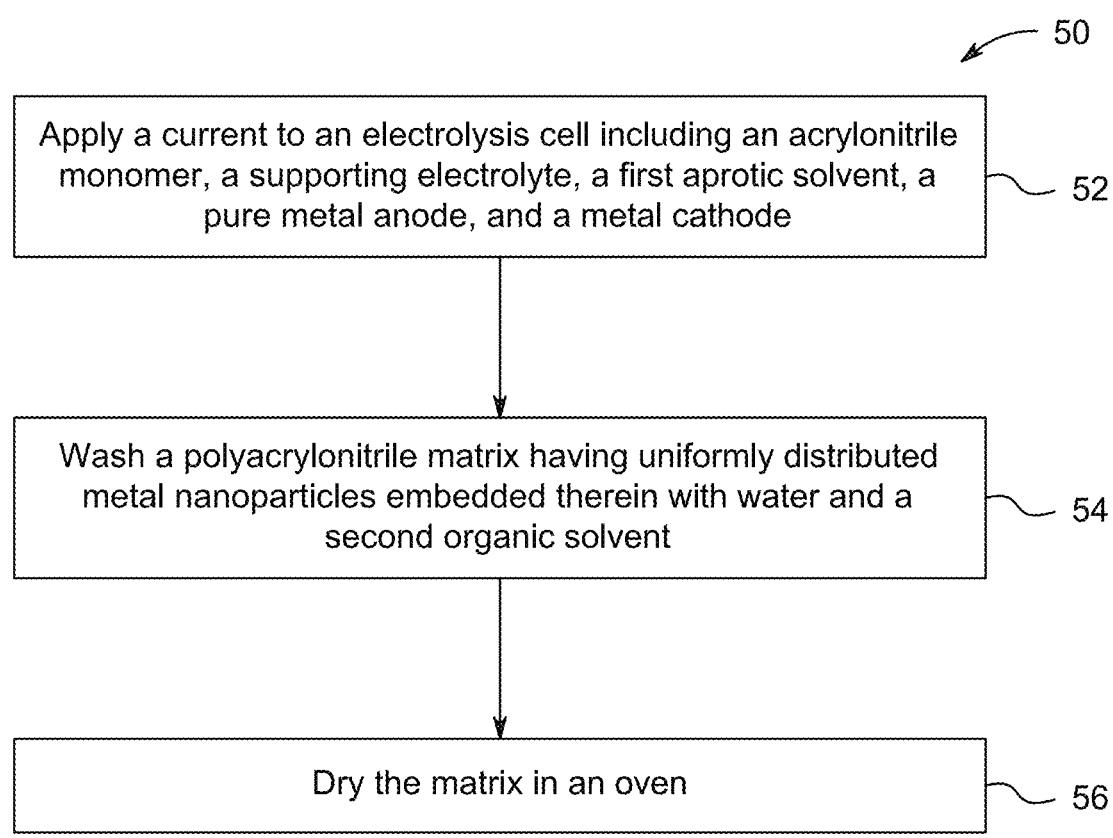
FIG. 1 is an exemplary flowchart illustrating a method for synthesizing a nanocomposite including a polyacrylonitrile (PAN) matrix having uniformly distributed metal nanoparticles embedded therein, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views.

Further, as used herein, the words "a", "an", and the like generally carry a meaning of "one or more", unless stated otherwise.

Furthermore, the terms "approximately", "approximate", "about", and similar terms generally refer to ranges that include the identified value within a margin of 20%, 10%, or preferably 5%, and any values therebetween.

As used herein, the term "room temperature" refers to a temperature range of 25° C.±3° C. in the present disclosure.

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

The present disclosure is intended to include all hydration states of a given compound or formula, unless otherwise noted or when heating a material.

In the present disclosure, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present disclosure, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., and 1° C.

The present disclosure is intended to include all isotopes of atoms occurring in the present compounds. Isotopes include those atoms having the same atomic number but different mass numbers. By way of general example, and without limitation, isotopes of hydrogen include deuterium ($^2H$) and tritium ($^3H$), isotopes of carbon include $^{13}C$ and $^{14}C$, isotopes of nitrogen include $^{14}N$ and $^{15}N$, isotopes of iron include $^{54}Fe$, $^{56}Fe$, $^{57}Fe$, and $^{58}Fe$ and isotopes of copper include $^{63}Cu$ and $^{65}Cu$. Isotopically labeled compounds of the disclosure can generally be prepared by conventional techniques known to those of ordinary skill in the art or by processes and methods analogous to those described herein, using an appropriate isotopically labeled reagent in place of the non-labeled reagent otherwise employed.

As used herein, the term "nanoparticles (NPs)" refers to particles having a particle size of 1 nanometer (nm) to 500 nm within the scope of the present disclosure.

As used herein, the term "nanocomposite" refers to a composite material that has at least one component with a grain size measured in nanometers.

As used herein, the term "electrolysis" refers to a process in which an external electrical current is applied to an electrochemical cell to induce a non-spontaneous chemical reaction. This process typically involves the transfer of electrons at the electrodes, leading to the reduction of ions at the cathode and oxidation of species at the anode, and is commonly used for the decomposition of compounds, metal deposition, or chemical synthesis.

As used herein, the term "electro-polymerization" refers to a process in which monomer units are polymerized through an electrochemical reaction, typically initiated by the application of an electric potential to an electrode immersed in a monomer-containing electrolyte solution.

As used herein, the term "in-situ electro-polymerization" refers to the electrochemically driven polymer formation that occurs directly on or within a substrate or matrix, enabling simultaneous polymer growth and integration in a single step.

As used herein, the term "acrylonitrile polymerization" refers to a chemical process in which acrylonitrile monomers undergo polymerization, typically through free-radical, ionic, or electrochemical mechanisms, to form polyacrylonitrile (PAN).

As used herein, the term "supporting electrolyte" refers to an inert ionic compound added to the electrolyte solution in an electrochemical cell to provide ionic conductivity and maintain a stable ionic strength without participating directly in the electrochemical reactions. The supporting electrolyte helps to minimize solution resistance, reduce electrode polarization, and ensure uniform current distribution during electrochemical processes.

As used herein, the term "aprotic solvent" refers to a solvent that does not contain acidic hydrogen atoms capable of forming hydrogen bonds and thus cannot donate protons ($H^+$) in solution. Aprotic solvents are typically polar and can dissolve a wide range of ionic and non-ionic compounds without participating in hydrogen bonding. Examples include dimethyl sulfoxide (DMSO), dimethylformamide (DMF), acetonitrile, and tetrahydrofuran (THF).

Aspects of the present disclosure are directed to a nanocomposite including a polyacrylonitrile matrix having uniformly distributed metal nanoparticles embedded therein. The described nanocomposite is synthesized using an electro-polymerization technique that produces highly uniform and well-dispersed nanostructures without additional processing.

FIG. 1 illustrates a schematic flow chart of a method 50, a method for synthesizing a nanocomposite including polymer matrix and metal nanoparticles by electro-polymerization technique. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method includes applying a current to an electrolysis cell including an acrylonitrile monomer, a supporting electrolyte, a first aprotic solvent, a pure metal anode, and a metal cathode. In some embodiments, the monomers may include acrylamide, methyl methacrylate (MMA), styrene, aniline, pyrrole, thiophene, and their derivatives. In a preferred embodiment, acrylonitrile (AN) monomer is used, and polyacrylonitrile (PAN) is synthesized by polymerizing acrylonitrile (AN) monomer. In some embodiments, the polymerization of acrylonitrile (AN) may be carried out using various techniques, including gas-phase polymerization, bulk or mass polymerization, solution polymerization, emulsion polymerization, solid-phase polymerization, and electrochemical polymerization. In a preferred embodiment, the AN is polymerized by the electro-polymerization technique.

In some embodiments, the number average molecular weight (Mn) of the PAN is 100-150 g $mol^{-1}$, preferably 105-145 g $mol^{-1}$, preferably 110-140 g $mol^{-1}$, preferably 115-135 g $mol^{-1}$, and preferably 120-130 g $mol^{-1}$. In some embodiments, the weight average molecular weight (Mw) of the PAN is 220-280 g $mol^{-1}$, preferably 225-275 g $mol^{-1}$, preferably 230-270 g $mol^{-1}$, preferably 235-265 g $mol^{-1}$, and preferably 240-260 g $mol^{-1}$. In some embodiments, the polydispersity of the PAN is 1-3, preferably 1.2-2.8, preferably 1.4-2.6, preferably 1.6-2.4, preferably 1.8-2.2, and preferably 2.0.

In some embodiments, the pure metal anode is selected from copper, nickel, cobalt, and iron, where the pure metal anode is a metal strip, having a length of 2-3 cm, preferably 2.1-2.9 cm, preferably 2.2-2.8 cm, preferably 2.3-2.7 cm and preferably 2.4-2.6 cm and a width of 0.5-2 cm, preferably 0.6-1.9 cm, preferably 0.7-1.8 cm, preferably 0.8-1.7 cm, preferably 0.9-1.5 cm. In some embodiments, the pure metal anode can be made up of various transition metals including copper (Cu), titanium (Ti), molybdenum (Mo) or stainless steel and the metal anode may be fabricated in different shapes suitable for electrochemical cells, such as wires, rods, foils, plates, meshes, or strips, depending on the cell design and desired surface area for efficient electrochemical reactions. In a preferred embodiment, 99.9999% pure Cu, Ni, Co, and Fe metal sheets are used as the anode in the electrochemical cell. These metals act as high-purity metal electrodes and nanoparticle precursors, which eliminates the need for metal salts, reducing agents, surfactants, or stabilizers.

In some embodiments, the metal cathode may include metals like Cu, Ni, Fe, Co, Ti, Pt, Au, Ag, Al, Zn, Pb, Sn, and Mo and the metal cathode may be fabricated in different shapes suitable for electrochemical cells, such as wires, rods, foils, plates, meshes, or strips. In a preferred embodiment, the metal cathode is platinum, where the metal cathode is a metal strip, having a length of 2-3 cm, preferably 2.1-2.9 cm, preferably 2.2-2.8 cm, preferably 2.3-2.7 cm and preferably 2.4-2.6 cm and a width of 0.5-2 cm, preferably 0.6-1.9 cm, preferably 0.7-1.8 cm, preferably 0.8-1.7 cm and preferably 0.9-1.5 cm. In an embodiment, the length and width of the platinum strip is 2.5 cm and 1 cm, respectively.

In some embodiments, the supporting electrolyte may include, but is not limited to, potassium chloride (KCl), sodium chloride (NaCl), potassium nitrate ($KNO_3$), sodium sulfate ($Na_2SO_4$), lithium perchlorate ($LiClO_4$), tetraethylammonium tetrafluoroborate ($TEABF_4$), sodium perchlorate ($NaClO_4$), ammonium sulfate (($NH_4$)$_2SO_4$), potassium phosphate ($K_3PO_4$), tetra-n-butylammonium hexafluorophosphate ($TBAPF_6$). In an embodiment, the supporting electrolyte is cetyltrimethylammonium bromide. In some embodiments, the concentration of the supporting electrolyte is in a range of 0.001-0.01 M, preferably 0.002-0.009 M, preferably 0.003-0.008 M, preferably 0.004-0.007 M. In a preferred embodiment, the supporting electrolyte is cetyltrimethylammonium bromide, and the concentration of the supporting electrolyte 0.005 M.

In some embodiments, the first aprotic solvent may include DMSO, DMF, acetonitrile (ACN), THF, 1,4-dioxane, N-methyl-2-pyrrolidone (NMP), dichloromethane (DCM), chloroform, ethyl acetate, toluene, hexane, and/or combinations thereof. In a preferred embodiment, the first aprotic solvent is DMF and the electro-polymerization process is carried out in a non-aqueous solvent (DMF) with the supporting electrolyte, enabling the controlled nanoparticle dispersion within the polymer matrix.

While applying the current during the process, the pure metal anode is oxidized to form the metal nanoparticles, and the acrylonitrile monomer is polymerized to form the polyacrylonitrile matrix around the metal nanoparticles. One of the important factors influencing the molecular weight of the polymer and the size distribution of the metal nanoparticles in the nanocomposite is the current density and the duration of the electrolysis process. In some embodiments, the current applied to the electrolysis cell is 0.2-8 milliampere per square centimeter (mA cm$^{-2}$), preferably 0.3-7 mAcm$^{-2}$, preferably 0.3-6 mAcm$^{-2}$, where the current is applied for 20-40 hours. In some other embodiments, the current may be applied for 20-40 hours (h), preferably 21-39 h, preferably 22-38 h, preferably 23-37 h, preferably 24-36 h, preferably 25-35 h, preferably 26-34 h, preferably 27-33 h, preferably 28-33 h and preferably 29-31 h. In a specific embodiment, a constant current density ranging from 0.4 to 4 mA cm$^{-2}$ is applied for 30 h to control the molecular weight of the polymer and size distribution of the metal nanoparticles.

In a specific embodiment, the constant current density is 4.0 mA cm$^{-2}$, and the average particle size of the metal nanoparticles is 50-150 nm, preferably 55-145 nm, preferably 60-140 nm, and preferably 65-135 nm.

In some embodiments, the pure metal anode of the electrolysis cell is oxidized to form metal nanoparticles, where the metal nanoparticles may include but are not limited to gold (Au), silver (Ag), platinum (Pt), palladium (Pd), copper (Cu), nickel (Ni), zinc (Zn), iron (Fe), cobalt (Co), or their oxides and alloys. In a preferred embodiment, the PAN matrix includes transition metal nanomaterials embedded within polymer matrices.

The method of fabricating the nanoparticles within the polymer matrix may include different techniques, including in situ synthesis, sol-gel processing, electrochemical deposition, chemical reduction, hydrothermal method, solvothermal methods, and solution casting. In some embodiments, the metal nanoparticles and the polymer matrix can be formed simultaneously, and in some other embodiments, the metal nanoparticles may be synthesized separately and subsequently incorporated into the pre-formed PAN matrix. In the present disclosure, the method includes the in-situ electro polymerization-assisted fabrication of metal nanomaterials within polymer matrices, where the polyacrylonitrile matrix and the metal nanoparticles are formed simultaneously.

In some embodiments, the metal nanoparticles formed during the process may be amorphous, partially crystalline, or crystalline, depending on the synthesis conditions and materials used. In some embodiments, the nanoparticles may have average diameter in a range of from 15-195 nm, preferably 20-190 nm, preferably 25-180 nm, preferably 30-170 nm, preferably 50-160 nm, preferably 70-150 nm, preferably 90-120 nm and preferably 100-110 nm. In a preferred embodiment, the nanoparticles are crystalline and have an average diameter in a range of 10-200 nm.

In some embodiments, the metal nanoparticles may be degraded at a temperature ranging from 100-700° C., preferably 150-650° C., preferably 200-600° C., preferably 220-590° C., preferably 240-570° C., preferably 260-550° C., preferably 300-500° C., preferably 320-480° C., preferably 350-450° C., preferably 370-420° C. and preferably 400-410° C. In a preferred embodiment, the metal nanoparticles degrade between 700-1000° C. In some embodiments, the concentration of the acrylonitrile monomer is 1-4 M, preferably 1.2-3.8 M, preferably 1.4-3.6 M, preferably 1.5-3.5 M, preferably 1.6-3.4 M, preferably 1.7-3.3 M, preferably 1.8-3.2 M, and preferably 1.9-3.0 M. In a preferred embodiment, the concentration of acrylonitrile is 2 M and the electrolysis cell is kept at a temperature of 25° C. while applying the current. In some embodiments, the desired temperature of the cell is maintained by various techniques including Peltier thermoelectric modules, resistive heating elements, thermostated water jackets, circulating oil baths, air or liquid cooling systems, phase change materials (PCMs), vacuum insulation panels, ceramic or fiberglass insulation, heat sinks and temperature-controlled chambers. In a preferred embodiment, the temperature is maintained using a water bath.

At step 54, the method includes washing the polyacrylonitrile matrix having uniformly distributed metal nanoparticles embedded therein with water and a second organic solvent. In some embodiments, the polyacrylonitrile matrix can be removed and washed by different methods. In some embodiments, the polyacrylonitrile matrix including uniformly distributed metal nanoparticles can be removed directly, or in some embodiments, the method includes separation via filtration, centrifugation, decantation, solvent evaporation, vacuum drying, and solvent evaporation.

In some embodiments, the water used for washing the polyacrylonitrile matrix embedded with the metal nanoparticles can be deionized water, distilled water, ultrapure water, Milli-Q water, reverse osmosis (RO) water, or double-distilled water. In a preferred embodiment, the polyacrylonitrile matrix embedded with the metal nanoparticles can be washed thoroughly with redistilled or deionized water to remove any water-soluble by-products, unreacted electrolyte (e.g., cetyltrimethyl ammonium bromide), and ionic impurities.

In some embodiments, after water washing, the polyacrylonitrile matrix with the metal nanoparticles may be washed with the second solvent to remove traces of the aprotic solvent (e.g., DMF) and facilitate removal of organic impurities that are not water-soluble. Suitable examples of the second organic solvent include, but are not limited to, methanol, ethanol, isopropanol, acetone, ethyl acetate, dichloromethane, tetrahydrofuran (THF), acetonitrile, or other suitable organic solvents. In a preferred embodiment, the second organic solvent is ethanol.

At step 56, the method includes drying the matrix in an oven. In some embodiments, the method includes drying the matrix at a temperature of from 40-50° C., preferably 40.5-49° C., preferably 41-48.5° C., preferably 41.5-48° C., preferably 42-47.5° C., preferably 42.5-47° C., preferably 43-46.5° C., preferably 43.5-46° C. and preferably 44-45.5° C. In the present disclosure, the matrix is dried in an oven at 45° C. for several days. In some other embodiments, drying can be carried out using various techniques, including vacuum drying, oven drying, freeze drying, air drying, infrared drying, microwave drying, spray drying, rotary evaporation, and drying under an inert gas atmosphere.

The following examples are provided solely for illustration and are not to be construed as limitations of the present disclosure, as many variations thereof are possible without departing from the spirit and scope of the present disclosure.

EXAMPLES

The following examples demonstrate the synthesis of a nanocomposite and, more particularly, nanocomposite including polyacrylonitrile matrix and metal nanoparticles. The examples are provided solely for illustration and are not to be construed as limitations of the present disclosure, as many variations thereof are possible without departing from the spirit and scope of the present disclosure.

Example 1: Materials

Monomer: acrylonitrile (AN, 2 moles), electrolyte: cetyltrimethyl ammonium bromide (0.005 mole), solvent: dimethylformamide (DMF) (aprotic solvent), electrodes: platinum strips (used initially for pure polyacrylonitrile (PAN) synthesis), high-purity metal sheets (Cu, Ni, Co, Fe) (used as the anode for metal nanoparticle incorporation), equipment: two-electrode electrochemical cell constant-current power supply (Model 1030A, USA), digital multimeter (AD-900B, Japan) for voltage monitoring and circular water bath (VEB MLW, Type U4, GDR) for temperature control Glass thermometer (accuracy±0.1° C.) were used.

Example 2: Electro Polymerization Process

The acrylonitrile monomer (AN) and the supporting electrolyte were dissolved in DMF, ensuring a homogeneous solution. Further, the solution was transferred to the electrolytic cell, where electro-polymerization occurred under a constant current density for a continuous 30-hour preparation period. The current density was controlled within a range of 0.4 to 4 milliampere per centimeter square (mA/cm$^2$), allowing precise regulation of polymer growth and nanoparticle formation. The temperature was maintained at 25° C. using a water bath to ensure a stable reaction environment.

Example 3: Preparation of Polyacrylonitrile (PAN) and PAN-Metal Nanocomposites

Figure 2:
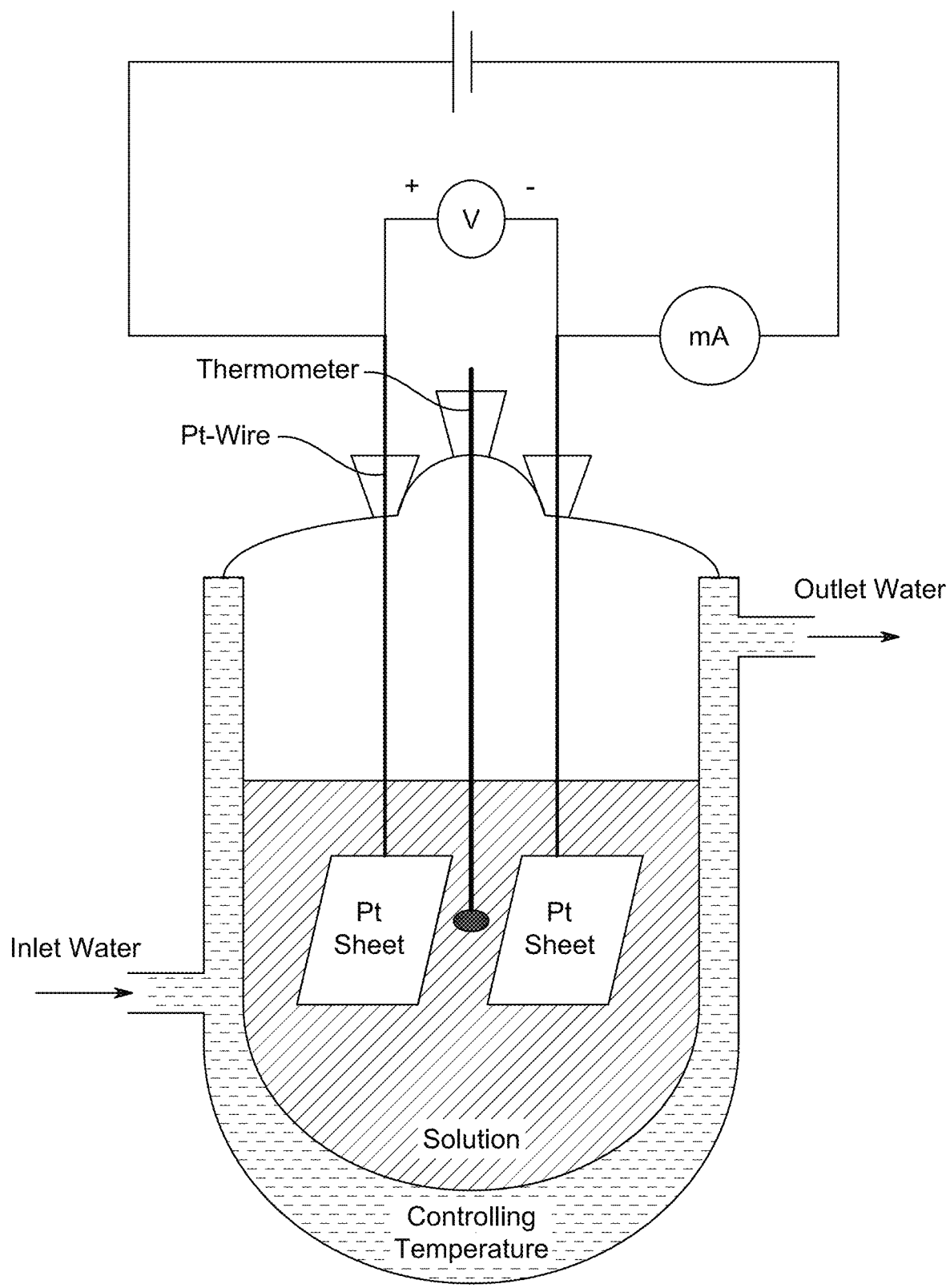
FIG. 2 illustrates an experimental setup used for polymerization of acrylonitrile (AN), according to certain embodiments.

PAN was synthesized by polymerizing AN monomer (Aldrich) with cetyltrimethyl ammonium bromide (Nentech) as a supporting electrolyte and the aprotic solvent dimethylformamide (DMF) (Analar Grad BDH). Experimental setup for the polymerization of AN is shown in FIG. 2. Two-electrode cells were used for the preparation of PAN homopolymer. The cell is made up of two platinum strips (1 cm×2.5 cm) hanging 2.5 cm apart by platinum wires sealed to a glass tube, with the electrical contact created through a small mercury pool on the enclosed end of the platinum electrodes. The platinum wires were attached to a millimeter (175 Autoranging Multimeter, Keithley, USA), a voltmeter (Digital Multimeter, Model AD-900B, Japan), and a constant-current power supply (Model 1030A, USA). A circular water bath (VEB MLW, Type U4, GDR) was used to maintain a constant temperature of 25° C. A glass thermometer with an accuracy of ±0.1° C. was plunged into the solution to measure its temperature. Polymerization resulted in a thin polymeric film deposited on the electrodes.

The electropolymerization of acrylonitrile (AN) yields two structurally distinct forms of polyacrylonitrile (PAN). The first, referred to as cathodically electropolymerized PAN (CPAN), deposits directly onto the cathode surface and is characterized by a striated, highly crosslinked morphology. The second form, known as medium electropolymerized PAN (MPAN), is recovered from the electrolyte solution and exhibits an amorphous structure (see X-ray diffraction pattern) with progressive cyclization as the current density increases. The data presented herein is representative of the polymer MPAN.

For the synthesis of PAN-metal nanocomposite, the platinum anode was replaced with high-purity metal sheets (Cu, Ni, Co, Fe). Electrochemical oxidation of the metal anode resulted in nanoparticle formation, which became embedded in the growing PAN matrix. This method produced uniformly dispersed metal nanoparticles within the polymer network, enhancing the mechanical and electrical properties of the material.

Figure 3:
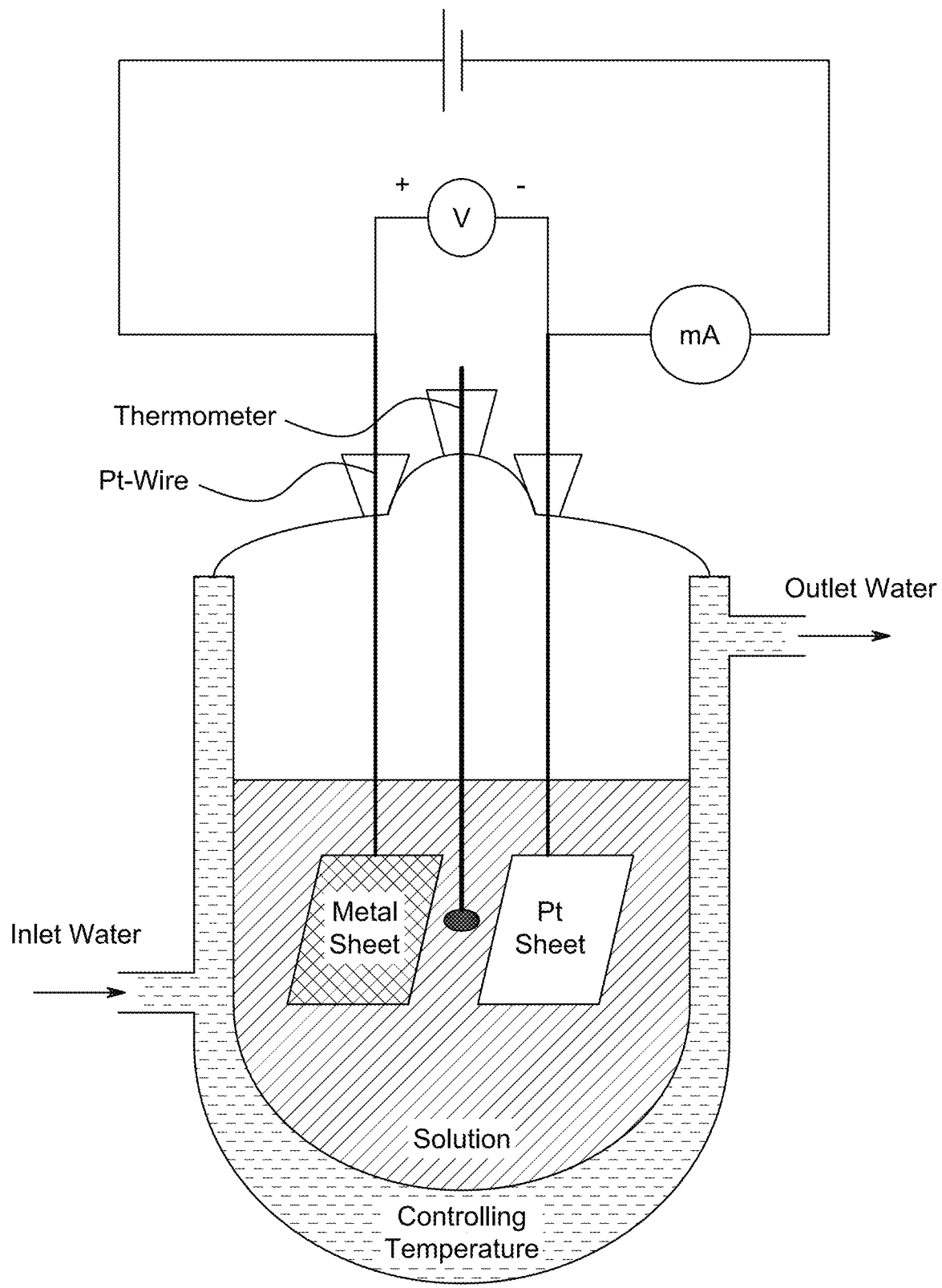
FIG. 3 illustrates an experimental setup to synthesize PAN-nanometals, according to certain embodiments.
Figure 4:
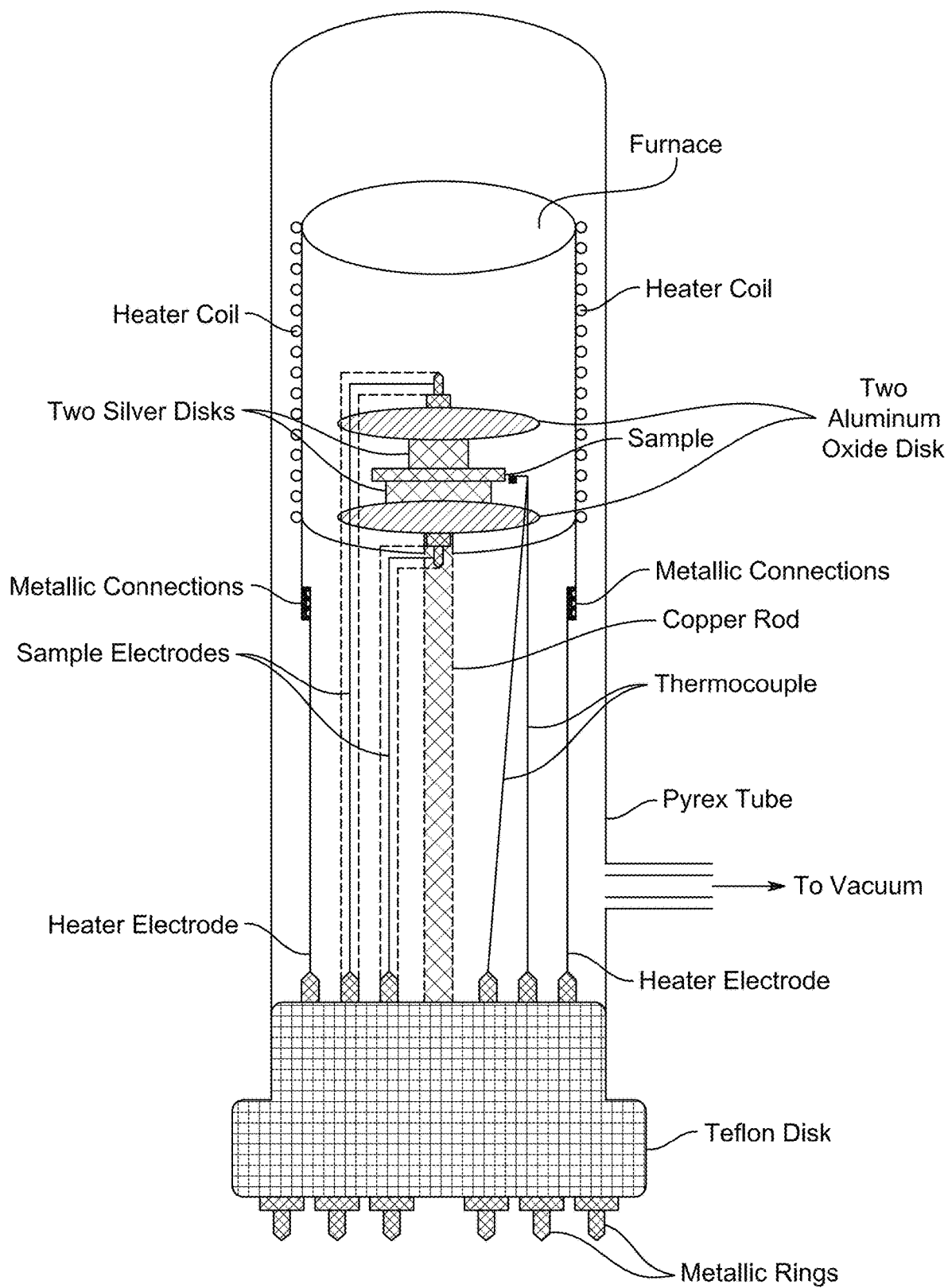
FIG. 4 illustrates a cross section of a cell used for alternative current (AC) conductivity and dielectric measurements, according to certain embodiments.

The PAN-nanometals are formed by electrochemical oxidation of metal in a non-aqueous solution of DMF during the polymerization of AN monomer with cetyltrimethyl ammonium bromide as the supporting electrolyte. FIG. 3 depicts the experimental setup to synthesize PAN-nanometals, which replaces the platinum anode with pure metal sheets of Cu, Ni, Co, and Fe (purity not less than 99.9999%, Aldrich), and electrode cells used for the preparation of PAN-nanometals. This approach is unique in that it uses high-purity metals to prepare nano-sized metals during the polymerization process, resulting in a mixture of polymer and nanometric metals. Also, this method for preparing nanometric materials does not involve metal salts, making it a cost-effective method. Cross-sectional view of the experimental setup used for alternating current (AC) conductivity and dielectric measurements of the synthesized PAN and PAN-metal nanocomposites is shown in FIG. 4. The setup includes metallic rings, Teflon disk, vacuum connection, heater electrode, pyrex tube, sample electrodes, thermocouple, copper rod, metallic connections, silver disks, aluminum oxide disks, sample holder, heater coil, and furnace to ensure precise conductivity and dielectric characterization.

The synthesized products were further categorized into two groups based on their form and separation method. The polymer-metal composite deposited on the cathode was removed directly, thoroughly washed with redistilled water, followed by ethyl alcohol, and then dried in an oven at 45° C. for several days. The suspended polymer-metal product present in the electrolyte solution was separated through filtration, followed by solvent evaporation to isolate the solid material for further characterization. This experimental approach provides a scalable, efficient, and cost-effective method for producing high-performance polymer-metal nanocomposites with controlled nanoparticle distribution, making them suitable for aerospace, electronic and structural applications.

Example 4: Experimental Validation and Characterization

To confirm the successful polymerization and nanoparticle formation, the resulting PAN and PAN-metal nanocomposites were analyzed using various characterization techniques. X-ray diffraction (XRD) pattern verifies the crystalline structure of embedded metal nanoparticles, and UV-visible spectroscopy (UV-Vis) analysis was done to study optical absorption and to further confirm the presence of nanometals within the nanocomposite. Fourier transform infrared spectroscopy (FTIR) analysis was done to analyze the functional groups and confirm nanoparticle-polymer interactions within the nanocomposite. Thermogravimetric analysis (TGA/DTG) was done to evaluate the thermal stability and degradation behavior of the nanocomposites. Atomic force microscopy (AFM) analyzes the nanoparticle size and dispersion within the polymer matrix, and the X-ray photoelectron spectroscopy (XPS) analysis was done to determine chemical composition and oxidation states of the embedded metals.

Figure 5:
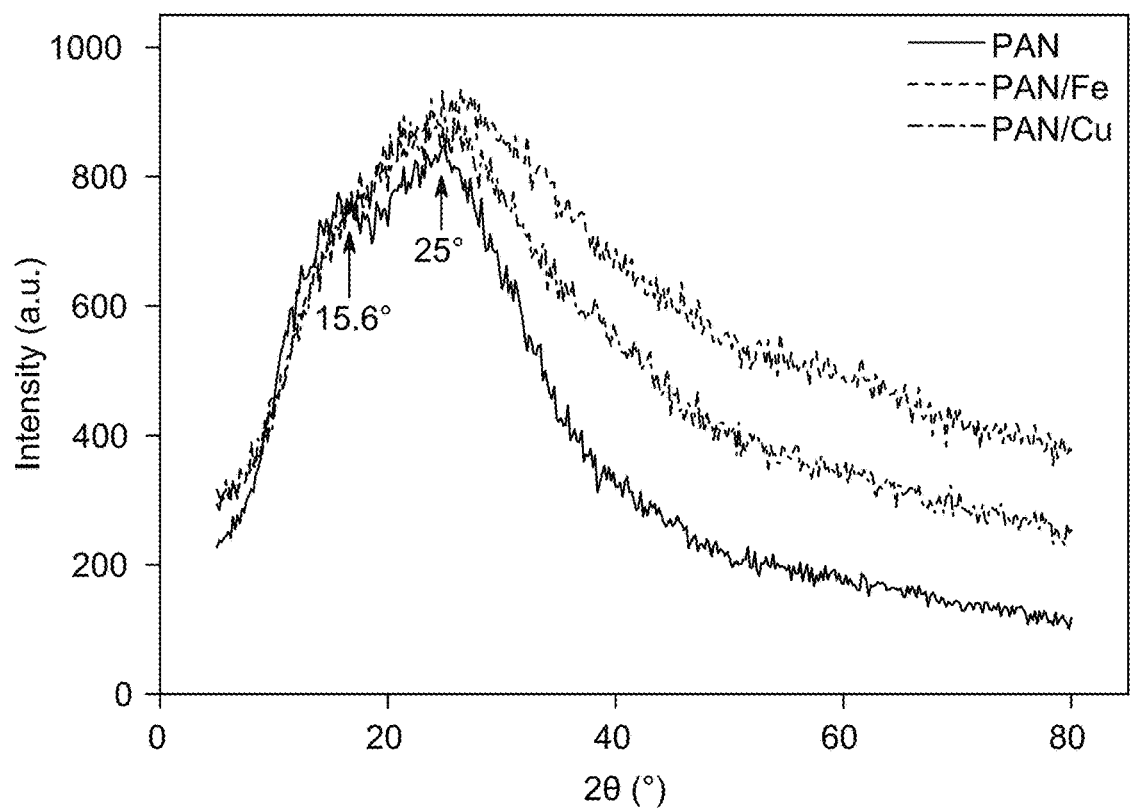
FIG. 5 illustrates X-ray diffraction (XRD) of pure polyacrylonitrile (PAN), polyacrylonitrile/iron (PAN/Fe), and polyacrylonitrile/copper (PAN/Cu) nanocomposites, according to certain embodiments.
Figure 6:
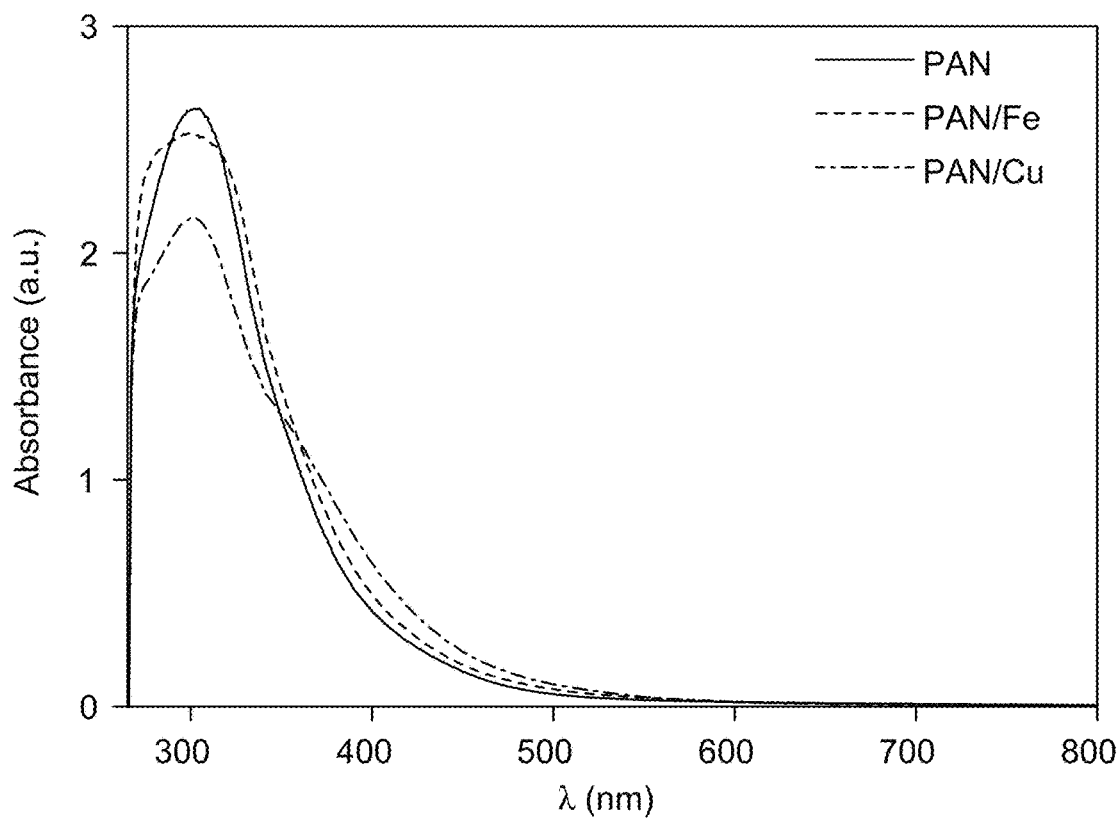
FIG. 6 illustrates UV-visible measurements of pure PAN, PAN/Fe, and PAN/Cu nanocomposites, according to certain embodiments.
Figure 7:
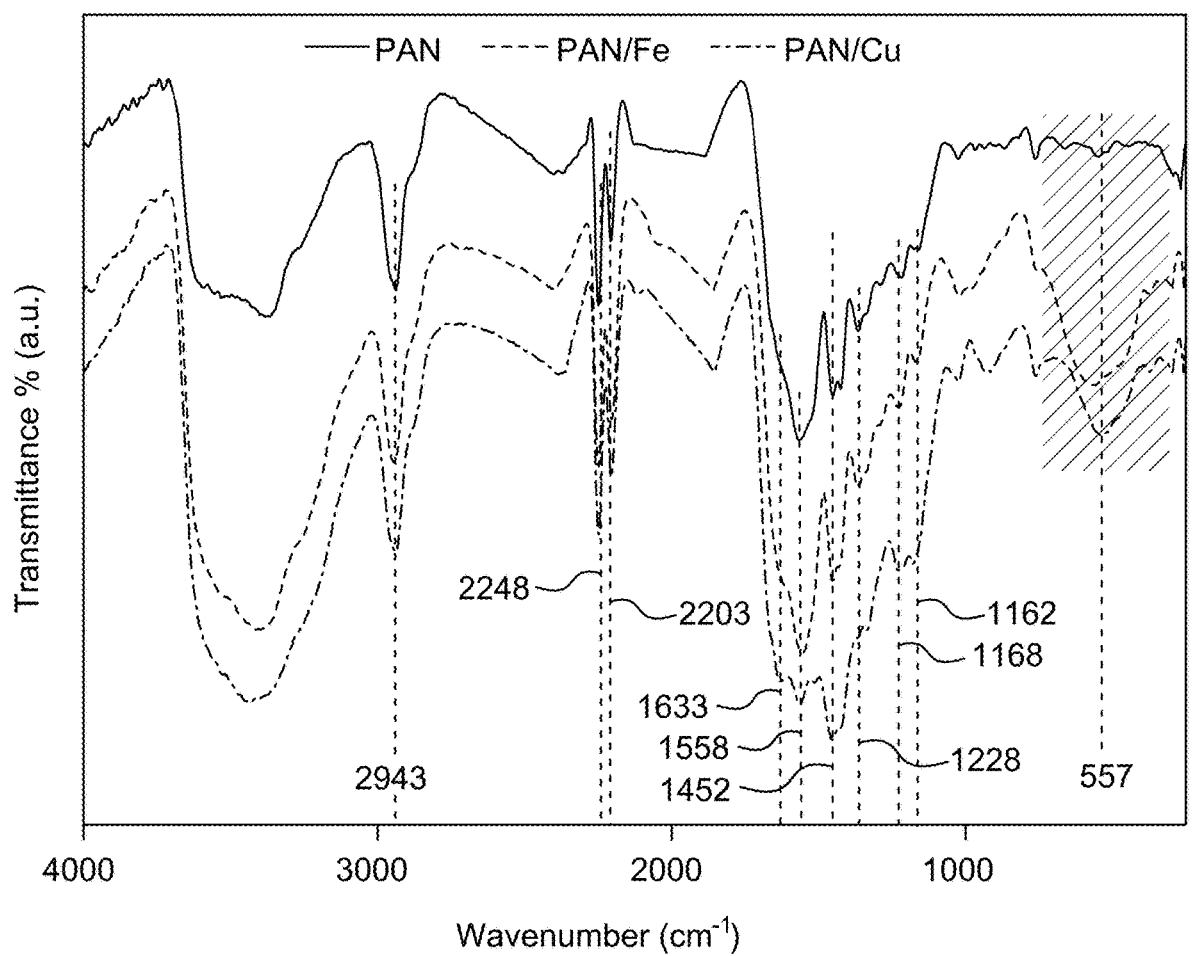
FIG. 7 illustrates a Fourier transform infrared (FTIR) spectra of pure PAN, PAN/Fe, and PAN/Cu nanocomposites, according to certain embodiments.
Figure 8A:
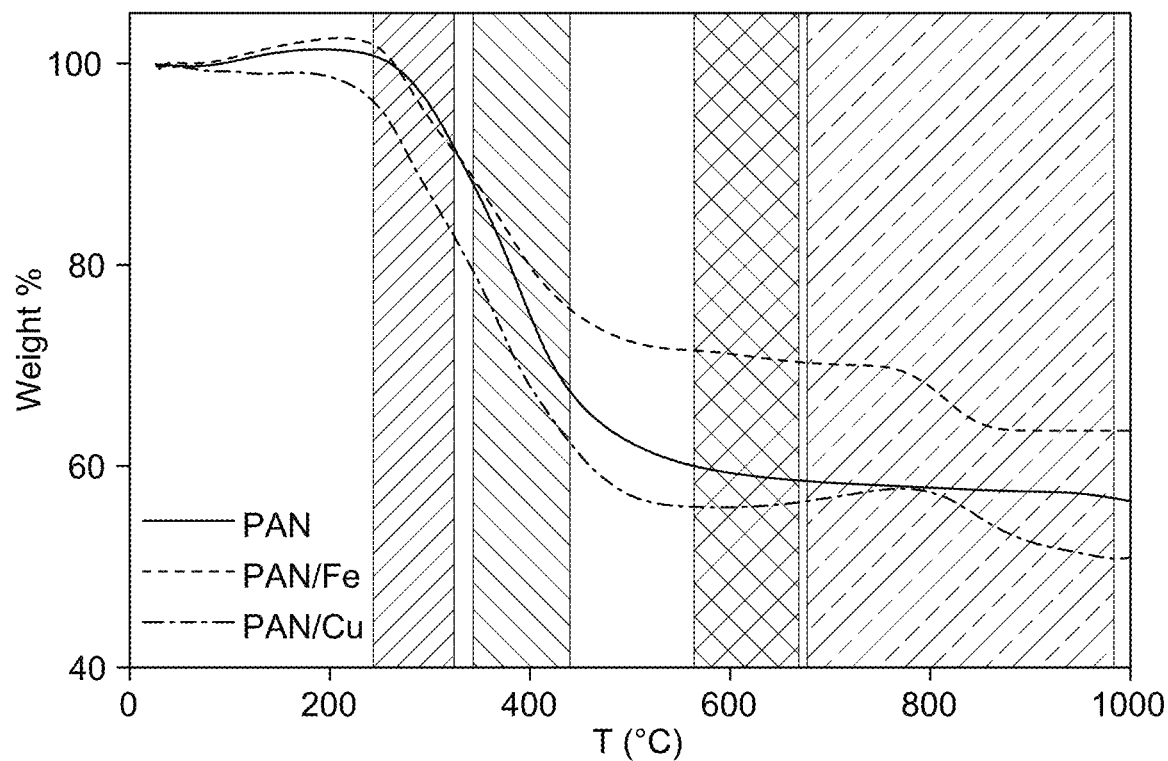
FIG. 8A illustrates a thermogravimetric analysis (TGA) spectra of pure PAN, PAN/Fe, and PAN/Cu nanocomposites, according to certain embodiments.
Figure 8B:
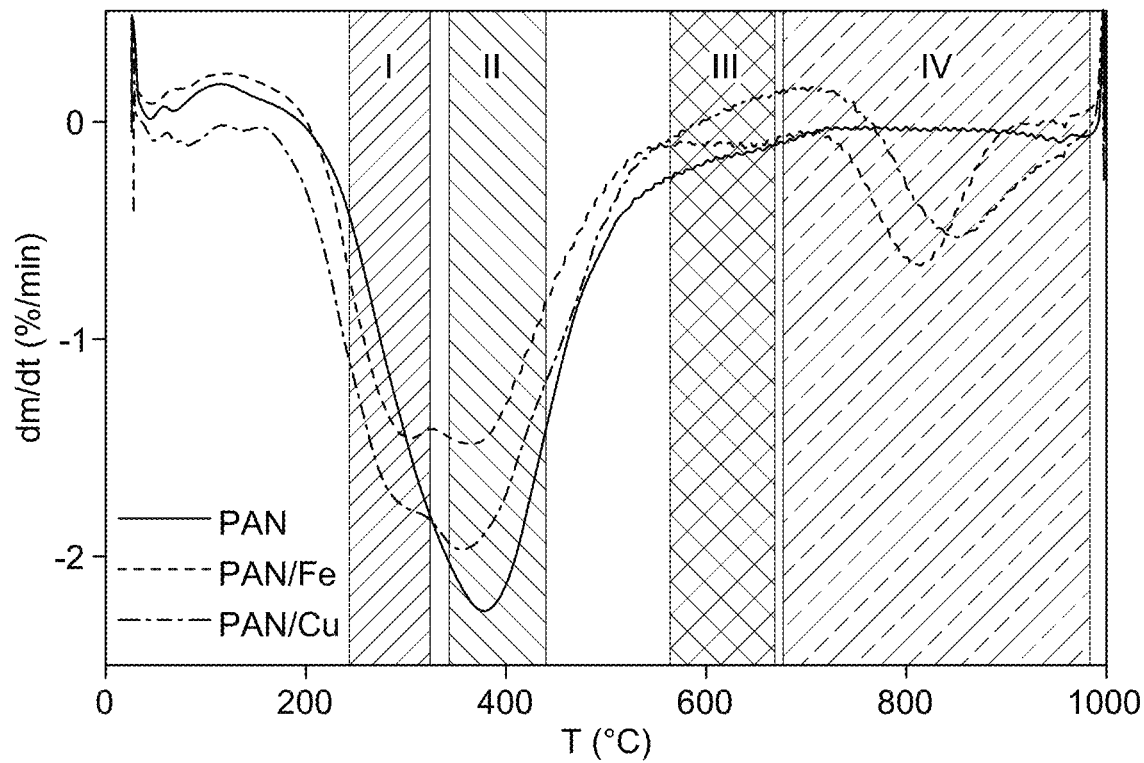
FIG. 8B illustrates a differential thermogravimetric analysis (DTG) spectra of pure PAN, PAN/Fe, and PAN/Cu nanocomposites, according to certain embodiments.
Figure 9:
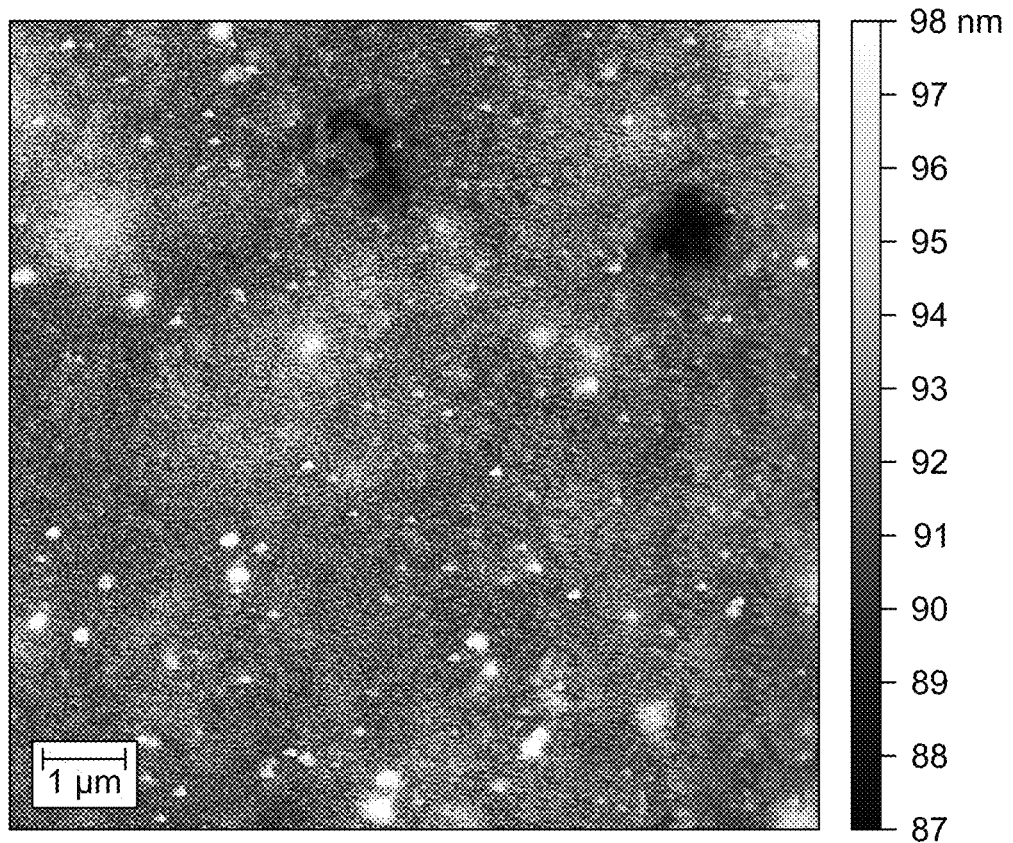
FIG. 9 illustrates an atomic force microscope (AFM-height) image of PAN/Fe nanocomposites, according to certain embodiments.
Figure 10A:
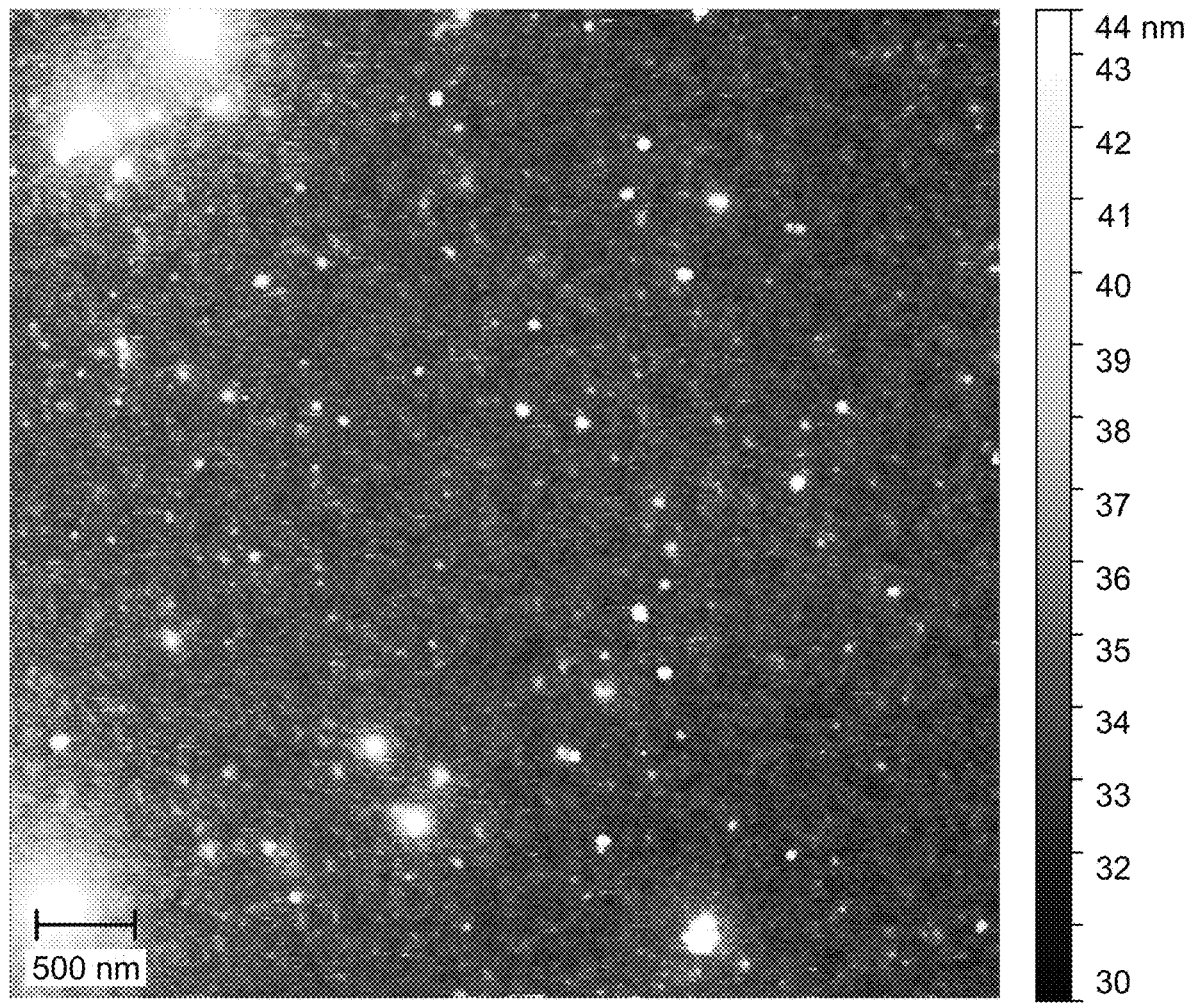
FIG. 10A illustrates the AFM-height image of PAN/Cu nanocomposites, according to certain embodiments.

XRD patterns of pure PAN, PAN-Fe, and PAN-Cu nanocomposites are shown in FIG. 5. The distinct peaks confirm the successful formation of metal nanoparticles within the polymer matrix, with characteristic diffraction patterns indicating crystallinity and phase composition. FIG. 6 displays the UV-vis absorption spectra of pure PAN, PAN-Fe, and PAN-Cu nanocomposites. The shifts in absorption bands provide evidence of nanoparticle formation and polymer-nanoparticle interactions, highlighting the optical properties of the synthesized materials. Fourier transform infrared spectroscopy (FTIR) spectra of pure PAN, PAN-Fe, and PAN-Cu nanocomposites (FIG. 7) show that the spectral analysis identifies key functional groups, with specific peaks corresponding to C≡N stretching, C—H vibrations, and metal-polymer interactions, confirming the incorporation of metal nanoparticles. Thermogravimetric analysis (TGA) and differential thermogravimetry (DTG) curves of pure PAN, PAN-Fe, and PAN-Cu nanocomposites are shown in FIGS. 8A-8B. The highlighted regions in the spectra indicate distinct degradation phases, including decomposition of the polymer matrix (stages I, II, III) and decomposition of embedded Fe and Cu nanoparticles (stage IV). These results validate the enhanced thermal stability and degradation behavior of the nanocomposites. AFM height image of the PAN-Fe nanocomposite shown in FIG. 9 depicts that the bright regions represent iron (Fe) nanoparticles embedded within the polymer, confirming their successful incorporation and dispersion and the AFM height image of the PAN-Cu nanocomposite (FIG. 10A) shows the white spots that corresponds to copper (Cu) nanoparticles, demonstrating the nanoparticle size distribution and surface morphology of the composite material.

The AFM height image of the polyacrylonitrile/iron (PAN/Fe) composite film obtained via in situ electropolymerization reveals a heterogeneous nanoscale surface morphology. The background film exhibits a relatively smooth polymer matrix, within which brighter protrusions corresponding to iron nanoparticles are distinctly visible. These nanoparticles appear as well-dispersed spherical or quasi-spherical domains embedded within the PAN matrix, confirming that the electrodeposition process facilitated nucleation and confinement of metallic species at the nanoscale. The presence of darker regions may be associated with localized depressions or void-like surface features, which are often formed due to partial aggregation or differential polymer growth kinetics at the electrode-electrolyte interface.

Figure 10B:
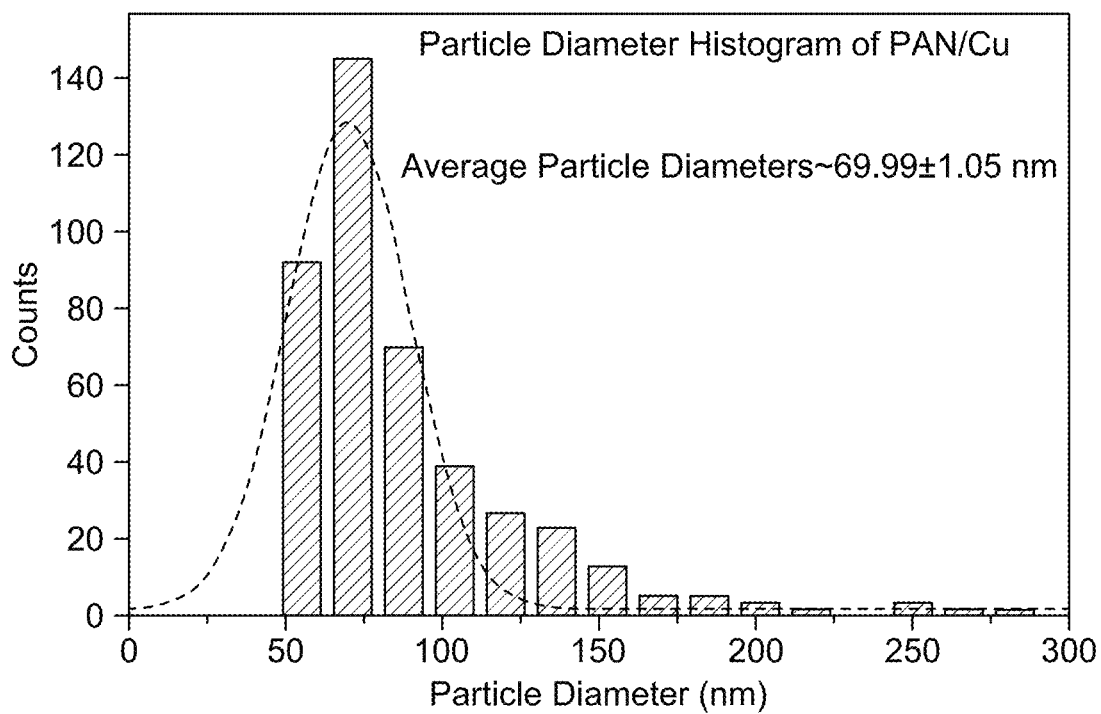
FIG. 10B illustrates the particle diameter histogram of PAN/Cu nanocomposites, according to certain embodiments.
Figure 10C:
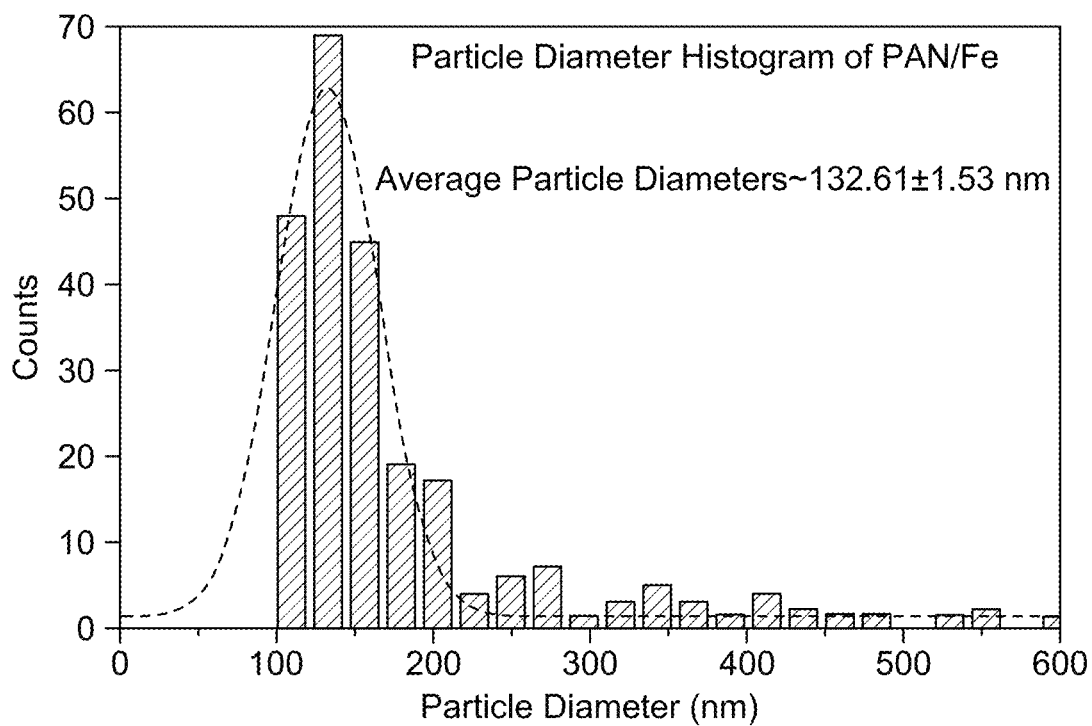
FIG. 10C illustrates the particle diameter histogram of PAN/Fe nanocomposites, according to certain embodiments.

Quantitative analysis of the nanoparticle size distribution, as extracted from AFM measurements and represented in the histogram, demonstrates that the Fe nanoparticles are not monodisperse but follow a moderately broad distribution. The average particle diameter was determined to be approximately 132.61±1.53 nm, indicating that the majority of particles fall within the sub-200 nm regime. The histogram (FIG. 10C) exhibits a sharp maximum around 100-150 nm, reflecting the dominant size fraction, followed by a long tail extending towards higher diameters up to nearly 500 nm. Such a distribution suggests that, while the electropolymerization process favors nucleation of nanoscale Fe domains, secondary processes such as particle coalescence or Ostwald ripening may contribute to the formation of larger aggregates.

The observed morphology highlights the dual role of the electrode configuration: the platinum electrode serves as a stable counter-electrode to sustain the current density, while the iron electrode provides a continuous source of Fe ions that are simultaneously reduced and incorporated into the growing PAN network. This synergistic process allows in situ stabilization of metallic nanoparticles by the polymeric host, restricting their uncontrolled growth. The nanoscale dispersion of Fe particles, as evident from the AFM data, is expected to enhance interfacial interactions between the inorganic domains and the organic matrix, which can contribute to improved mechanical strength, electronic conductivity, and potential catalytic activity of the resulting composite.

Importantly, the nanoscale topography and the relatively narrow standard deviation of the particle size (±1.53 nm around the mean) indicate a high degree of control in the synthesis route. This suggests that the electropolymerization parameters, particularly the applied current density of 4.0 $mA/cm^2$, effectively regulate the kinetics of ion reduction and polymer growth, enabling reproducible generation of nanoscale Fe inclusions. Such structural features are critical for applications requiring homogeneous nanocomposites with controlled particle loading, including functional coatings, membranes, and catalytic systems.

The AFM height image of the polyacrylonitrile/copper (PAN/Cu) composite film synthesized via in situ electropolymerization displays a nanoscale surface topography characterized by bright protrusions distributed across a relatively uniform polymeric background. These protrusions, which correspond to copper nanoparticles, are well-dispersed within the PAN matrix and exhibit a consistent spherical or near-spherical geometry. The distribution of particles (FIG. 10B) indicates that the electropolymerization process effectively promoted localized nucleation of copper while simultaneously entrapping the metallic nanoparticles within the growing polymer chains. The uniform reddish background suggests the presence of a continuous PAN phase, while the brighter white spots confirm the presence of nanoscale Cu inclusions.

The quantitative particle size analysis, as represented by the histogram, reveals that the copper nanoparticles possess an average diameter of approximately 69.99 nm. The distribution curve shows a pronounced maximum within the sub-100 nm region, which highlights the dominance of nanoscale features in the composite. The narrower particle size spread compared to analogous Fe-based systems suggests that copper ions undergo more controlled reduction under the applied current density of 4.0 $mA/cm^2$. This may be due to the distinct electrochemical properties of copper, which favor uniform nucleation and limit extensive coalescence. The restricted aggregation contributes to a relatively sharp particle size distribution with fewer large outliers.

The successful formation of well-dispersed Cu nanoparticles within the PAN matrix can be attributed to the role of the electrodes. The copper electrode continuously supplies $Cu^{2+}$ ions, which are reduced in situ during electropolymerization. The simultaneous growth of the PAN chains provides a steric and electrostatic stabilization mechanism that prevents excessive particle growth and aggregation. This synergy results in nanoscale copper domains being immobilized and evenly distributed within the polymer framework.

The fine dispersion and smaller average size of copper nanoparticles enhance interfacial contact with the PAN matrix, which leads to improved electrical conductivity, mechanical reinforcement, and potential catalytic or antimicrobial activity. The ability to reproducibly generate particles in the 70 nm range highlights the tunability of the electropolymerization approach.

Figure 11:
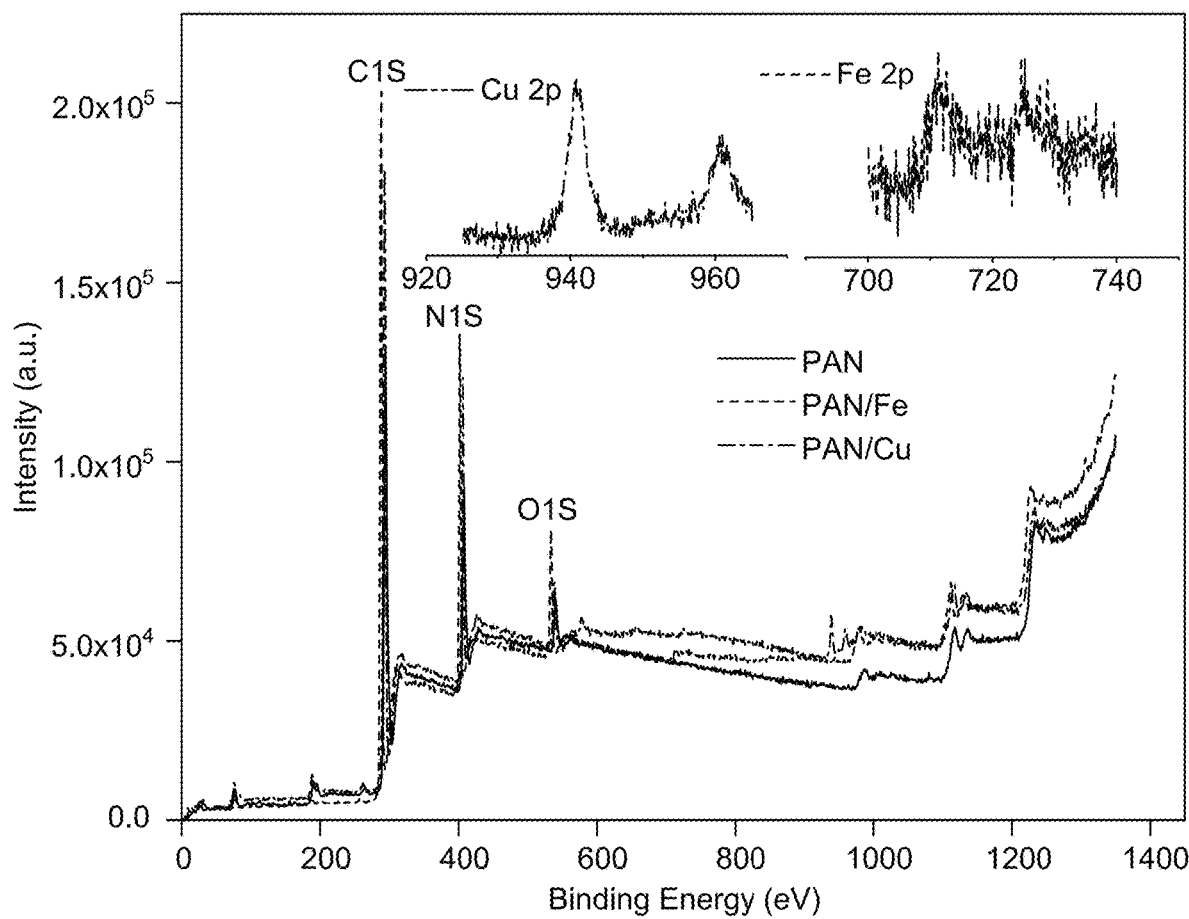
FIG. 11 illustrates an X-ray photoelectron (XPS) spectra of pure PAN, PAN/Fe, and PAN/Cu nanocomposites, according to certain embodiments.

X-ray photoelectron spectroscopy (XPS) spectra of pure PAN, PAN-Fe, and PAN-Cu nanocomposites provide elemental composition and oxidation states, confirming the presence of iron and copper nanoparticles and their interaction with the polymer matrix (FIG. 11).

The polymer-metal nanocomposites characterized using XRD, UV-vis, FTIR, TGA, AFM, and XPS techniques confirm the successful formation of uniformly dispersed metal nanoparticles within the polymer. These characterization results also validate the reproducibility and material properties of the nanocomposite.

The present disclosure focuses on the electro polymerization-assisted synthesis of polymer-metal nanocomposites that include in-situ nanoparticle formation during electro polymerization. The method enables simultaneous polymerization of an acrylonitrile-based monomer and in-situ generation of metal nanoparticles through electrochemical oxidation of a high-purity metal anode, providing a scalable, single-step manufacturing approach for large-scale nanocomposite production without the need for multi-step synthesis. The process occurs in a single-compartment two-electrode electrochemical cell, eliminating the need for pre-synthesized nanoparticles or metal salt precursors. The metal salt-free approach removes the need for toxic precursors, reducing environmental impact and making the process more sustainable. The one-step electro polymerization process reduces time, cost, and complexity compared to traditional multi-step nanoparticle synthesis and polymer blending techniques. The present disclosure also provides a scalable and reproducible synthesis method that can be adapted for large-scale industrial production of polymer-metal nanocomposites. The process parameters (e.g., current density, electrolyte composition, and reaction time) can be tailored to meet the specific needs of various commercial applications. The method allows simultaneous deposition of multiple metal nanoparticles by using bi-metallic or multi-metallic anodes, expanding the potential applications in catalysis, energy storage, and advanced composites. Also, by adjusting electrochemical conditions, the present disclosure enables precise control over nanoparticle size, dispersion, and interaction with the polymer matrix, and the resulting materials can be tailored for applications requiring enhanced mechanical strength, conductivity, or thermal stability.

The present work presents a cost-effective and scalable approach to high-performance polymer-metal nanocomposite fabrication. The nanocomposite of the present disclosure shows can be incorporated in wear-resistant coatings, flexible electronics, antimicrobial coatings, drug delivery compositions, and energy storage devices such as supercapacitors and lithium-ion battery electrodes.

Numerous modifications and variations of the present disclosure are possible in light of the above teachings. It is therefore to be understood that within the scope of the appended claims, the disclosure may be practiced otherwise than as specifically described herein.

The invention claimed is:

1. A method for synthesizing a nanocomposite comprising a polyacrylonitrile matrix having uniformly distributed metal nanoparticles embedded therein, said method comprising:
    applying a current to an electrolysis cell containing an electrolysis mixture comprising an acrylonitrile monomer, a supporting electrolyte, a first aprotic solvent, a pure metal anode, and a metal cathode,
    wherein during the applying the anode is oxidized to form the metal nanoparticles and the acrylonitrile monomer is polymerized to form the polyacrylonitrile matrix around the metal nanoparticles.

2. The method of claim 1, wherein the polyacrylonitrile matrix and the metal nanoparticles are formed concurrently during the applying.

3. The method of claim 1, wherein the current applied is 0.2-8 mA cm$^{-2}$.

4. The method of claim 1, wherein the current is applied for 20-40 hours.

5. The method of claim 1, wherein the concentration of the acrylonitrile monomer in the electrolysis mixture is 1-4 M.

6. The method of claim 1, wherein the pure metal anode is selected from the group consisting of copper, nickel, cobalt, and iron.

7. The method of claim 1, wherein the pure metal anode is a metal strip, having a length of 2-3 cm and a width of 0.5-2 cm.

8. The method of claim 1, wherein the metal cathode is platinum.

9. The method of claim 1, wherein the metal cathode is a metal strip, having a length of 2-3 cm and a width of 0.5-2 cm.

10. The method of claim 1, wherein the electrolysis cell is kept at a temperature of 20-30° C. during the applying.

11. The method of claim 1, wherein the first aprotic solvent is dimethylformamide.

12. The method of claim 1, wherein the supporting electrolyte is cetyltrimethylammonium bromide.

13. The method of claim 1, wherein the concentration of the supporting electrolyte in the electrolysis mixture is 0.001-0.01 M.

14. The method of claim 1, wherein the metal nanoparticles are crystalline.

15. The method of claim 1, wherein the metal nanoparticles have an average diameter of 10-200 nm.

16. The method of claim 1, further comprising:
    washing the polyacrylonitrile matrix having uniformly distributed metal nanoparticles embedded therein with water and a second organic solvent; and
    drying the matrix in an oven.

17. The method of claim 16, wherein the second organic solvent is ethanol.

18. The method of claim 16, wherein the matrix was dried in an oven at 40-50° C.

19. The method of claim 1, wherein the current density applied to the electrolytic cell is constant during the applying.

20. The method of claim 1, wherein the metal nanoparticles degrade between 700-1000° C.

* * * * *